UNITED STATES PATENT OFFICE.

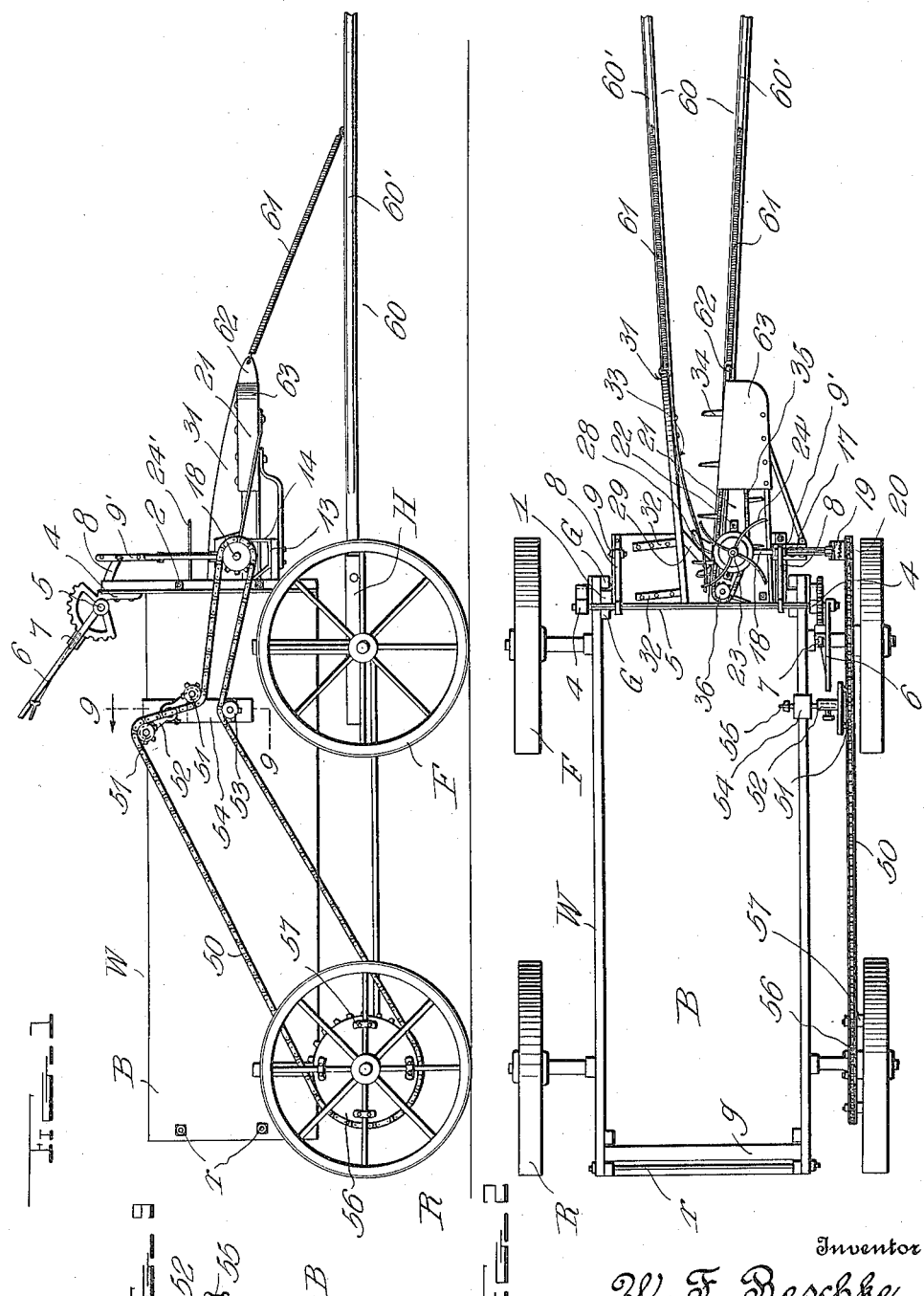

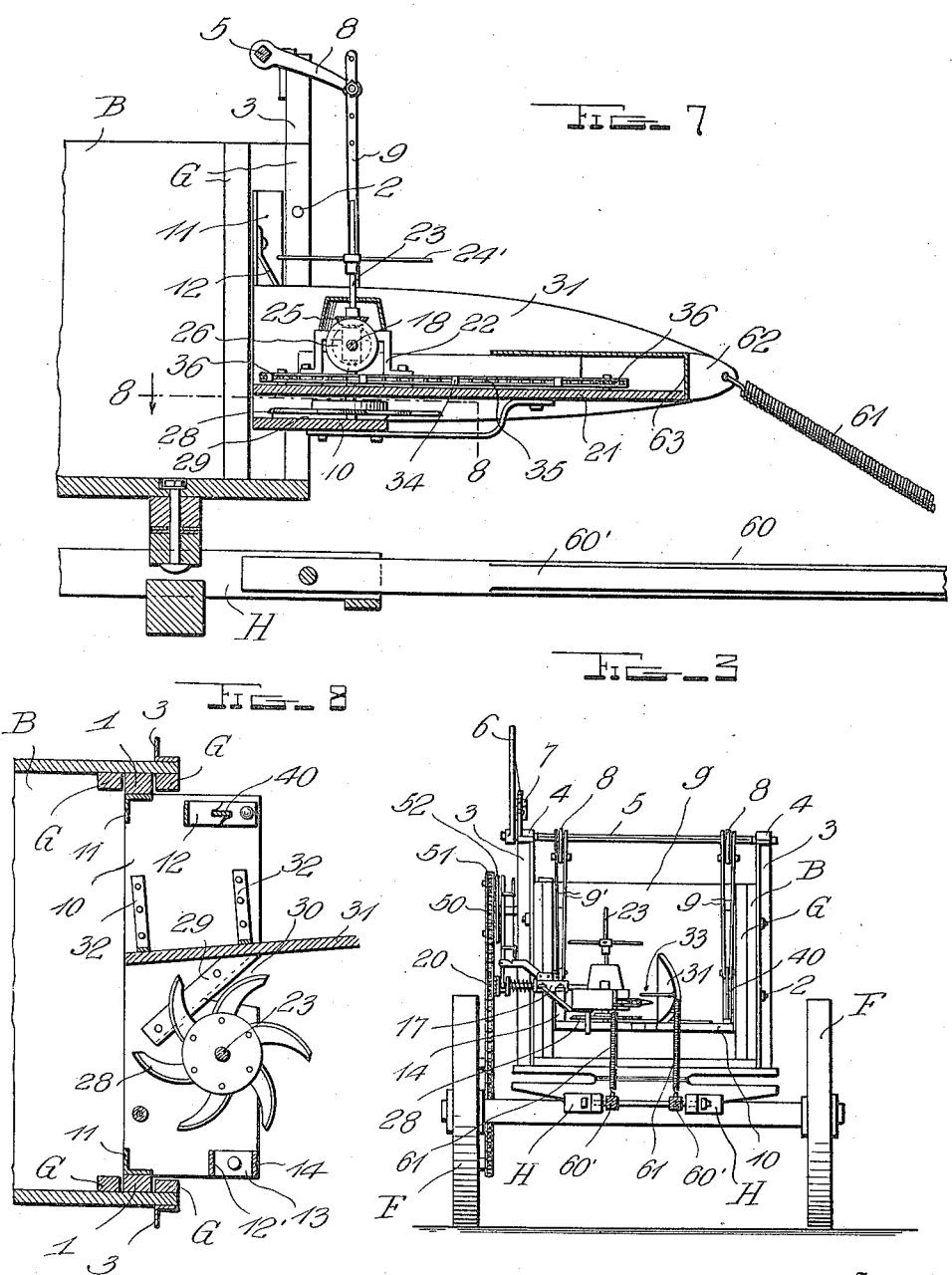

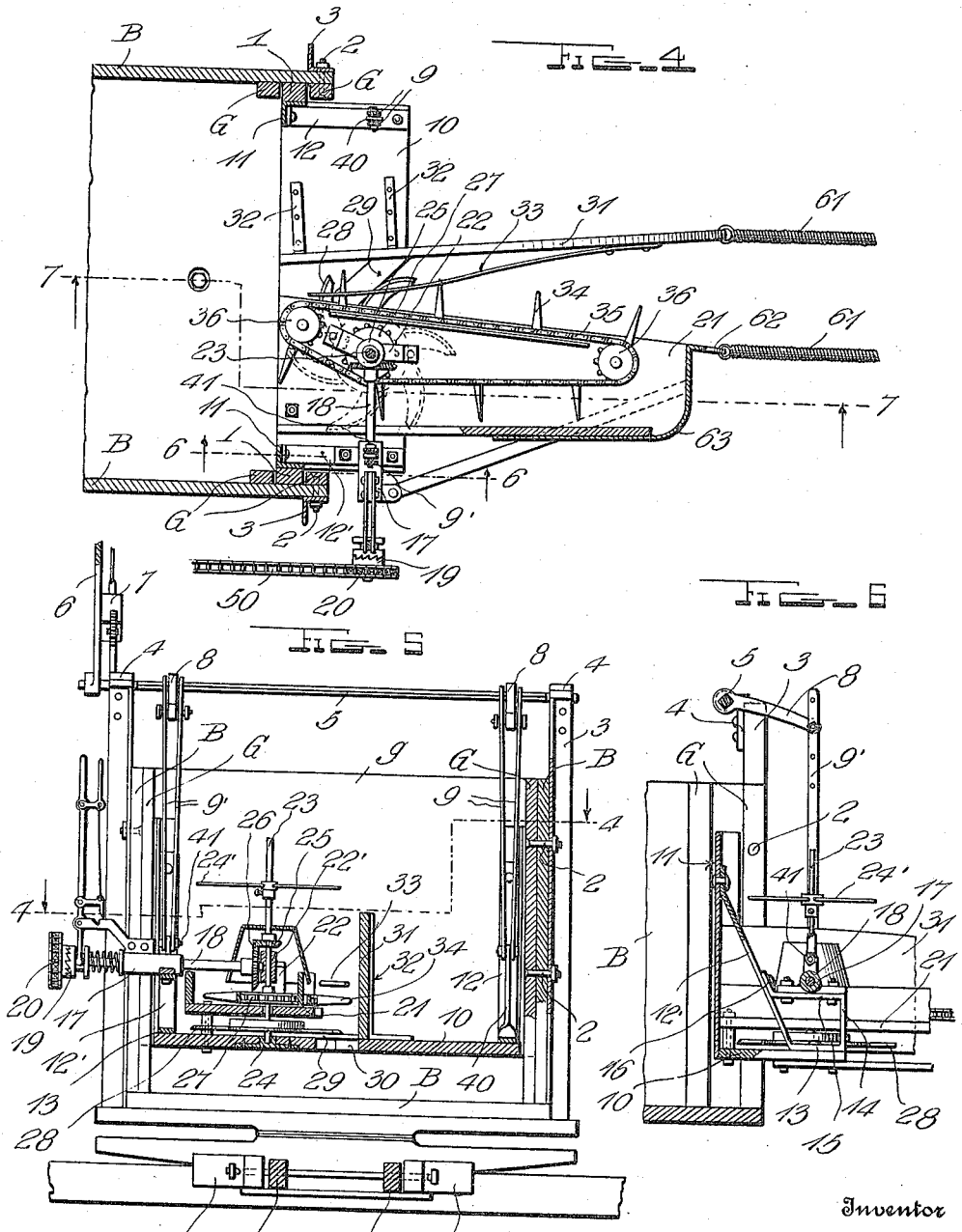

WILLIAM F. RESCHKE, OF WICHITA, KANSAS.

KAFIR-CORN HEADER.

1,160,759.  Specification of Letters Patent.  Patented Nov. 16, 1915.

Application filed March 18, 1915. Serial No. 15,258.

*To all whom it may concern:*

Be it known that I, WILLIAM F. RESCHKE, a citizen of the United States, residing at Wichita, in the county of Sedgwick and State of Kansas, have invented certain new and useful Improvements in Kafir - Corn Headers; and I do declare the following to be a full, clear, and exact description of the invention, such as will enable others skilled in the art to which it appertains to make and use the same.

My invention relates broadly to improvements in Kafir corn headers and more particularly to heading attachments for farm wagons.

The main object of the invention is to provide an extremely simple, yet highly efficient attachment of this character which may be disposed in the front end of a wagon bed and set up for operation without the necessity of mutilating or altering the bed in any manner whatsoever.

A further object is to provide a split tongue to be attached to the wagon for operation in conjunction with the heading mechanism, the two halves of the tongue being adapted to straddle the row of corn being headed.

Yet another object is to connect the heading device and the two halves of the split tongue by a pair of expansible corn guides, whereby although the tongue may move vertically to a certain extent, the guides will remain at all times in proper relation to the remaining features of the device, this being likewise true when the heading mechanism is adjusted vertically.

A still further object is to provide very simple means for raising and lowering the heading attachment and to so construct this means as to allow it to likewise be attached to the wagon bed without altering or mutilating the same.

With the above and numerous minor objects in view, the invention resides in certain novel features of construction and combination hereinafter more fully described and claimed and shown in the drawings wherein:—

Figure 1 is a side elevation of a farm wagon showing the application of the invention thereto; Fig. 2 is a top plan view of the parts seen in Fig. 1; Fig. 3 is a front end view of the wagon with the invention attached thereto, the split tongue being shown in section; Fig. 4 is a top plan view, partly in horizontal section as seen on the plane of the line 4—4 of Fig. 5; Fig. 5 is a front elevation partly in section; Fig. 6 is a detail vertical longitudinal section as seen substantially upon the plane indicated by the line 6—6 of Fig. 4; Fig. 7 is a substantially central longitudinal section taken along the plane indicated by the irregular line 7—7 of Fig. 4; Fig. 8 is a detail horizontal section as seen along the plane of the line 8—8 of Fig. 7; and Fig. 9 is a detail vertical transverse section taken on the line 9—9 of Fig. 1 and showing more particularly the construction of the chain tightener.

In these drawings constituting a part of this application, W designates a farm wagon of ordinary construction equipped with front and rear wheels F, R and with the usual bed or body B whose upright sides are provided with the usual spaced upright guides G at their front and rear ends, these guides being adapted to normally receive the front and rear gates $g$ of the wagon, stay bolts or rods $r$ being passed through the front and rear ends as is common with devices of this character.

In applying the heading device, to be described, the front gate is removed as are also the front stay bolts, thereby leaving the spaces between the upright guides G for the reception of a pair of upright guide shoes 1 and leaving the openings through which the rods formerly passed free to receive the bolts 2 by which a pair of upright angle iron standards 3 may be attached, these standards rising above the sides of the bed and being equipped with bearings 4 in which a transverse rock shaft 5 is mounted. This shaft is provided with a rearwardly extending operating lever 6 which may be locked in adjusted position by a pawl and rack mechanism indicated at 7, and with a pair of forwardly extending arms 8 from which links 9 and 9' depend, these links being preferably connected to the arms in such a manner as to allow them to be adjusted vertically. The construction so far described constitutes the raising and lowering means for the heading device proper now to be described.

Disposed in the open front end of the bed B is a transverse horizontally disposed supporting member or board 10 from whose opposite ends upright angle irons 11 rise, these angle irons being secured in any appropriate manner to the shoes 1, whereby the entire supporting board 10 may be moved upwardly and downwardly. In the present instance, the two angle irons 11 are shown as located at the rear corners of the board 10 and as being braced by a pair of upwardly and rearwardly inclining bars 12 and 12', these bars being secured at their upper ends to said angle irons and at their lower ends to the board near its forward edge.

As most clearly seen in Fig. 6, the bracing bar 12' has its lower end bent forwardly at 13 and secured to the board 10, is then bent upwardly as seen at 14, is continued rearwardly at 15 to provide a bearing support and is secured at 16 to the inclined portion of the bar. By this simple construction, a very efficient bracket is provided for the support of a transverse bearing 17. It is within this bearing 17 that a horizontal transversely extending shaft 18 is revolubly mounted, the outer end of this shaft being provided with a sectional clutch 19 for locking a driven sprocket wheel 20 thereto and for releasing such wheel therefrom, this wheel being driven by means to be hereinafter described.

Spaced above the right hand end portion of the supporting board 10 and rigidly connected therewith in an appropriate manner, is a forwardly extending deck 21 from which a bearing bracket 22 rises, this bracket carrying an upright bearing 22' in which an upright shaft 23 is revolubly mounted, the lower end of said shaft being supported in a step bearing 24 carried by the board 10 while its upper end rises a considerable distance above the bearing 22' and is provided with a number of arcuate feeding fingers 24', these fingers being carried by a hub which is adjustable vertically on the shaft.

Immediately above the bearing 22', the shaft 23 is equipped with a bevel gear 25 which meshes with a second bevel gear 26 keyed on the shaft 18 whereby revolution of the latter will in turn revolve the shaft 23 and all parts carried thereby, while immediately below said bearing 22', the shaft 23 is equipped with a sprocket wheel 27 which revolves immediately above the deck 21. Below this deck 21 the shaft 23 is provided with a rotary cutter 28 which is composed of a number of arcuate cutting blades seen more particularly in Figs. 4 and 8, these blades projecting an appropriate distance beyond the edge of the deck as clearly shown and coöperating with a fixed blade 29 which is secured to the supporting board 10 at an appropriate point, said board being here shown as provided with a V-shaped notch 30 in its front edge and as having one edge of this notch provided with the blade 29. It will therefore be seen that when the stalks of corn are guided into the notch 30, the rotating cutter 28 will sever the tops from the bodies thereof, which tops will then fall rearwardly into the wagon bed.

For the purpose of so guiding and feeding the stalks of corn to the cutting mechanism, the supporting board 10 is provided, near its left hand end, with an upstanding forwardly projecting guide wing 31 which is here shown as secured thereto by a pair of L-shaped brackets 32, this wing and the adjacent edge of the deck diverging forwardly as clearly disclosed in Figs. 2 and 4. In the present case, the wing 31 is shown as provided on its inner side with a longitudinally extending horizontally disposed leaf spring 33 whose front end is secured to the front end of said wing while its rear end is disposed contiguous to the inner edge of the deck 21, whereby said spring will exert its tension to force the corn being headed laterally toward the rotary cutter and in the position to be effectively grasped by a plurality of fingers 34 with which a feed chain 35 is provided. This chain passes around the front and rear guide sprockets 36 which are revolubly mounted upon the upper side of the deck 21 and one stretch thereof is meshed with the sprocket wheel 27, whereby rotation of the latter will move the left hand stretch of the chain rearwardly, thus causing its fingers 34 to move the corn stalks rearwardly into position to be severed by the rotary cutter 28 operating in conjunction with the fixed cutting blade 29 before described.

As it becomes necessary to raise and lower the entire heading device, when operating upon crops of different height, the rock shaft 5, arms 8, and links 9 and 9' have been provided as before suggested, the links 9 being here shown as pivoted at their lower ends to the upper end of a bar 40 which rises from the supporting board 10, while the links 9' are pivoted at 41 to an ear rising from the bearing 17. By this construction, it will be seen that rocking of the shaft 5 will raise and lower the entire heading device which is guided in its vertical movement by the shoes 1.

For the purpose of rotating the sprocket wheel 20 to actuate all moving parts of the heading device, I preferably employ the sprocket chain 50 whose upper and lower stretches lead rearwardly from said wheel, said upper stretch passing around a pair of idlers 51 carried by an adjustable bracket 52, while the lower stretch thereof passes over a third idler 53, this last named idler and the bracket 52 being carried by a hook-shaped bracket 54 which may be clamped by a set screw 55, or otherwise, to one side of the bed B as clearly disclosed in Figs. 1, 2 and 9. The chain 50, is in turn driven by a driving sprocket 56 which may be quickly and easily secured, by clamps 57 or other appropriate means, to one of the rear wheels R of the wagon, it being therefore evident that as the latter is drawn forwardly and straddles the row of corn being topped, the chain 50 will rotate the shaft 18, thus in turn rotating the upright shaft 23 to actuate the feeding chain 35, the feeding fingers 34, and the rotary cutter 28. In order to allow the rows of corn to be straddled, however, it becomes necessary to substitute a split tongue 60 for the usual wagon tongue, the two halves 60' of this tongue being connected in any suitable manner to the hounds H of the wagon. As a simple and efficient means of guiding the stalks of corn into the space between the wing and the deck, a pair of coil springs 61 have been provided, these springs being secured at their front ends to the two halves 60' of the tongue 60, while their rear ends are secured respectively to the front end of said wing and to an ear 62 which projects forwardly from the side wall of a guard 63 with which the front end of the deck is equipped, this guard overlying the feed chain 35 as clearly disclosed in Fig. 2. By providing coil springs for this purpose, it will be understood that vertical movement of the split tongue will be compensated for yet that the stalks will be readily guided at all times, since raising of said tongues will not allow the springs 61 to sag as would occur if guides in the form of cables for instance, were used. As the heading mechanism is adjusted vertically, the springs 61 expand for allowing such movement. I wish it understood however, that although coil springs are preferable for the purpose just described, I might employ any appropriate type of expansible and contractible guides to lead upwardly and rearwardly from the two halves of the split tongue of the heading device.

Although the above described features are the essentials of the attachment, it will be understood that numerous minor additions may be made to the device, such for instance, as the provision of a number of appropriate shields for the various moving parts of the device, one of said shields being indicated as incasing the bevel gears 25 and 26.

It may be well to here explain that in order to sever the tops of the corn stalks before said stalks are struck by the front axle of the wagon, it is necessary to position the rotary cutter a considerable distance in advance of said axle. Were the feed chain 35 passed only around the front idler 36 and around the sprocket 27 on the shaft 23, the several tops would not be conveyed to the rear end of the deck, thus causing them to pile up in rear of the aforesaid sprocket 27. It is to be observed, however, that the chain 35 is extended to the rear edge of the board 10 and is here passed around the rear idler 36. This is advantageous since it conveys the severed tops to such a point as to readily deposit them within the wagon box.

From the foregoing description, taken in connection with the accompanying drawings, it will be evident that although a very simply constructed device has been provided for converting the ordinary wagon into a Kafir corn header, such attachment will be very efficient in operation and will possess a number of advantageous features.

I claim:

1. The combination with a farm wagon having a bed, of a grain heading device disposed at the front end of said bed, a split tongue extending forwardly from the front axle of the wagon and adapted to straddle the rows of grain being headed, and a pair of longitudinally expansible and contractible grain guides leading upwardly and rearwardly from the two halves of the tongue to the heading device.

2. The combination with a grain heading machine having a forwardly projecting split tongue, of a pair of longitudinally expansible and contractible grain guides extending upwardly and rearwardly from the two halves of the tongue to the heading mechanism.

3. The combination with a grain heading machine having a forwardly projecting split tongue, of a pair of coil springs extending upwardly and rearwardly from the two halves of the tongue to the heading mechanism to serve as grain guides.

4. The combination with a grain heading machine having vertically adjustable heading means, and a forwardly projecting split tongue, of a pair of longitudinally expansible and contractible grain guides leading upwardly and rearwardly from the two halves of the tongue to the heading means.

5. The combination with a grain heading machine having vertically adjustable heading means, and a forwardly projecting split tongue, of a pair of coil springs leading upwardly and rearwardly from the two halves of the tongue to the heading means.

6. A heading attachment for wagons comprising a horizontal supporting member adapted to be positioned transversely of a wagon bed at the front end thereof, guide shoes on the opposite ends of said member and adapted to be engaged with upright guides on the wagon, a deck projecting forwardly from the supporting member, an upstanding wing likewise extending forwardly from said supporting member in spaced relation to the deck, an upright driven shaft rising through the deck, a rotary cutter on said shaft and projecting therefrom toward the wing, and a feeding chain overlying said deck and actuated by said shaft.

7. A heading attachment for wagons comprising a horizontal supporting member adapted to be positioned transversely of a wagon bed at the front thereof, guide shoes on the opposite ends of said member and adapted to be engaged with upright guides on the wagon, a deck spaced above said supporting member and projecting forwardly therefrom, an upstanding wing likewise extending from said supporting member in spaced relation to the deck, an upright driven shaft rising through the deck, a rotary cutter on said shaft below the deck and projecting therefrom toward the wing, and a feeding chain overlying said deck and actuated by said shaft.

In testimony whereof I have hereunto set my hand in presence of two subscribing witnesses.

WILLIAM F. RESCHKE.

Witnesses:
J. W. BLOOD,
C. MILLER.

Copies of this patent may be obtained for five cents each, by addressing the "Commissioner of Patents, Washington, D. C."